United States Patent [19]

Tanaka et al.

[11] 4,014,707
[45] Mar. 29, 1977

[54] CERAMIC DIELECTRIC COMPOSITION

[75] Inventors: Hitoshi Tanaka; Hitoshi Masumura; Shinobu Fujiwara, all of Tokyo, Japan

[73] Assignee: TDK Electronics Company, Limited, Tokyo, Japan

[22] Filed: July 8, 1975

[21] Appl. No.: 594,017

[30] Foreign Application Priority Data

July 11, 1974   Japan ................. 49-79397

[52] U.S. Cl. .................... 106/73.31; 252/520; 252/521
[51] Int. Cl.² .................. C04B 35/46; H01B 1/06
[58] Field of Search ............. 106/73, 31; 252/520, 252/521

[56] References Cited

UNITED STATES PATENTS

| | | | |
|---|---|---|---|
| 2,420,692 | 5/1947 | Wainer | 106/73.31 |
| 2,436,839 | 3/1948 | Wainer | 106/73.31 |
| 2,576,379 | 11/1951 | Woodcock et al. | 106/73.31 |
| 2,576,380 | 11/1951 | Woodcock et al. | 106/73.31 |
| 2,801,181 | 7/1957 | DasGupta | 106/73.31 |
| 2,946,937 | 7/1960 | Herbert | 106/73.31 |
| 2,980,546 | 4/1961 | Plessner et al. | 106/73.31 |
| 3,068,107 | 12/1962 | Levinson | 106/73.31 |
| 3,080,239 | 5/1963 | Zlotnick | 106/73.31 |
| 3,103,440 | 9/1963 | Cline et al. | 106/73.31 |
| 3,231,799 | 1/1966 | Perkopowicz et al. | 106/73.31 |
| 3,490,927 | 1/1970 | Kahn | 106/73.31 |
| 3,533,966 | 10/1970 | Moratis | 106/73.31 |
| 3,666,505 | 5/1972 | Hoffman et al. | 106/73.31 |
| 3,788,867 | 1/1974 | Rutt | 106/73.31 |
| 3,862,046 | 1/1975 | Walker et al. | 106/73.31 |

*Primary Examiner*—Winston A. Douglas
*Assistant Examiner*—Mark Bell
*Attorney, Agent, or Firm*—Oblon, Fisher, Spivak, McClelland & Maier

[57] ABSTRACT

A dielectric ceramic composition comprises as principle constituents, 86 – 99.6 mole % of barium titanate, 0.2 – 10 mole % of niobium pentaoxide and 0.2 – 4 mole % of cerium oxide.

10 Claims, 2 Drawing Figures

CERAMIC DIELECTRIC COMPOSITION

BACKGROUND OF THE INVENTION

1. Field of the Invention

The present invention relates to a ceramic dielectric composition having a high dielectric constant and a small variation of its dielectric constant with temperature and which is easily formed into excellent ceramic devices.

2. Description of the Prior Art

Heretofore, it has been known that ceramic dielectric compositions having small temperature variations with changing temperature can be prepared by adding a bismuth compound to a dielectric, e.g., bismuth stannate is added to barium titanate to provide flat temperature characteristics in U.S. Pat. No. 2,908,579 and U.S. Pat. No. 3,410,705. In such compositions, a grain boundary is formed by the coating of the crystals of $BaTiO_3$ with a bismuth compound having a low melting point. As a result, the Curie point of the $BaTiO_3$ is changed such that a dielectric constant rather insensitive to temperature changes ensues.

In the past, there has been a need for a small ceramic capacitor having a large capacity and excellent characteristics for high frequency applications. The known compositions have not been satisfactory for such uses. It is advantageous for such a small ceramic capacitor with large capacity to have a high dielectric constant. However, a ceramic capacitor having a high dielectric constant usually has large variations of dielectric constant with temperature changes so that the size and the capacity have been limited.

Accordingly, in practice there have been attempts to decrease the thickness of the dielectric substrate and to increase its capacity. Dielectric substrates with thicknesses of 0.1 - 0.2 mm have been obtained. In the conventional technique of incorporating a bismuth compound in the composition, are several significant disadvantages: the bismuth compound can become vaporized; the substrate can become bent; or pin-holes can be formed making it difficult to produce a ceramic having high density. This is a deleterious factor for determining the maximum voltage of the capacitor. As a result, incorporation of an additive which is not vaporized by calcination is required. Additionally, the composition containing the bismuth compound has a disadvantageously high loss in high frequency operation. Moreover, bismuth is a toxic heavy metal so that use of a bismuth compound poses a serious problem from the viewpoint of heavy metal pollution.

Ceramic dielectric compositions having the formula $BaTiO_3$–$Nb_2O_5$–$MgO$ are disclosed in U.S. Pat. No. 3,788,867 and Ceramic Bulletin Vol. 50, no. 5, pages 488–492 (1971). These compositions have $\epsilon_s$ values of less than 2000 and inferior temperature characteristics. When MgO of the composition is replaced by $CeO_2$, the $\epsilon_s$ values of the compositions are about two times (about 4000) that of the conventional compositions.

As can be seen, it would be most desirable to have a dielectric ceramic composition which has a high dielectric constant which is insensitive to temperature variations.

SUMMARY OF THE INVENTION

Accordingly, it is an object of the present invention to provide a ceramic dielectric composition which has a high dielectric constant and a small variation of dielectric constant with temperature changes.

It is another object of this invention to provide a ceramic dielectric composition which is suitable for forming excellent ceramics having high density and which does not cause heavy metal pollution in its production.

These and other objects of this invention as will become clear by the ensuing discussion have been attained by providing a ceramic dielectric composition having a high dielectric constant, a small temperature dependence of the dielectric constant, an excellent capability for ceramic formation, and a low loss which comprises barium titanate, niobium pentaoxide and cerium oxide as main components.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
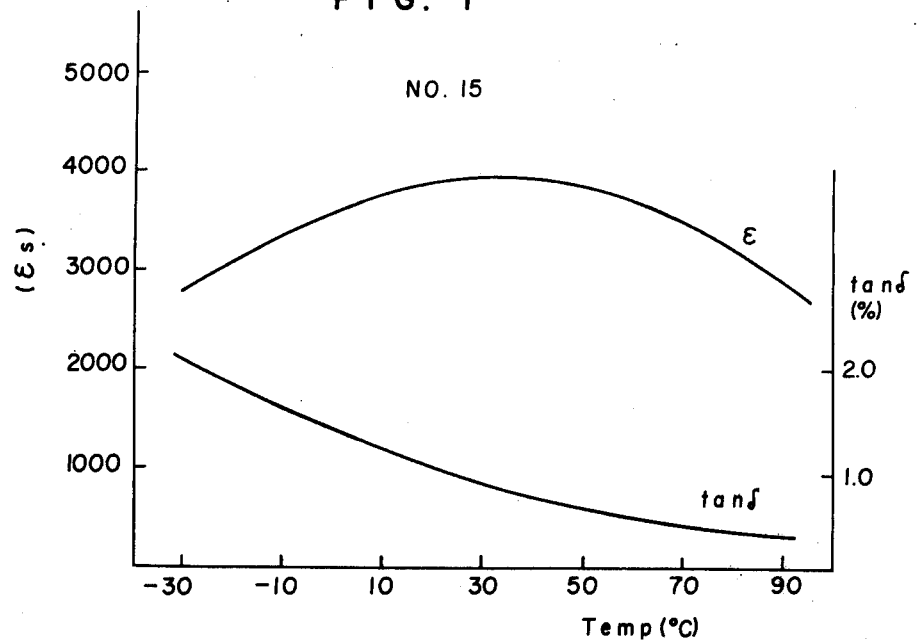
FIG. 1 shows temperature characteristics of the dielectric constant and the dielectric tangent of Sample 15 below.

The ceramic dielectric composition of this invention comprises 86 – 99.6 mole%, preferably 92 – 99.6 mole %, of barium titanate, 0.2 – 10 mole %, preferably 0.2 – 6.0 mole%, of niobium pentaoxide and 0.2 – 4 mole%, preferably 0.2 – 2.0 mole %, of cerium oxide as main components.

A second embodiment of the ceramic dielectric composition of this invention comprises 86 – 99.6 mole% of barium titanate, 0.2 – 10 mole% of niobium pentaoxide and 0.2 – 4 mole% of cerium oxide as main components with at least one of calcium titanate or magnesium titanate added in an amount of less than 10 wt%, preferably 0.5 – 5.0 wt% relative to the amount of the main components.

A third embodiment of the ceramic dielectric composition of this invention comprises 86 – 99.6 mole% of barium titanate, 0.2 – 10 mole% of niobium pentaoxide and 0.2 – 4 mole% of cerium oxide as main components with the addition of at least one of the oxides of Mn, Cr, Fe, Ni or Co, clay or a rare earth element, preferably an oxide, in an amount of 0.01 – 0.5 wt%, preferably 0.05 – 0.3 wt%, relative to the amount of the main components.

A fourth embodiment of the ceramic dielectric composition of this invention comprises 86 – 99.6 mole% of barium titanate, 0.2 – 10 mole% of niobium pentaoxide and 0.2 – 4 mole% of cerium oxide as main components with the addition of at least one of calcium titanate or magnesium titanate in an amount of less than 10 wt%, preferably 0.5 – 5 wt% relative to the amount of the main components, and at least one of the oxides of Mn, Cr, Fe, Ni or Co, clay or a rare earth element, preferably as an oxide, in an amount of 0.01 – 0.5 wt%, preferably 0.05 – 0.3 wt%, relative to the amount of the main components.

The reasons for the above-described limitations on the amounts of the components of the composition will now be illustrated.

When more than 99.6 mole% of barium titanate is incorporated, the sintering temperature is increased to higher than 1400° C, and ceramics having high density are not obtained. Both results are undesirable. When less than 86 mole% of barium titanate is incorporated, the dielectric constant is disadvantageously lower than about 900. When less than 0.2 mole% of niobium pentaoxide is incorporated, the sintering temperature is increased to higher than 1400° C, and the temperature characteristics are inferior. When more than 10 mole% of niobium pentaoxide is incorporated, the dielectric constant is disadvantageously lower than about 900, and the product is not amenable to practical use. When less than 0.2 mole% of cerium oxide is incorporated, the effect on the temperature characteristics by the shift of the Curie point does not occur and tan δ is disadvantageously high. When more than 4 mole% of cerium oxide is incorporated, the Curie point is significantly lowered, thereby deteriorating the temperature characteristics to values higher than 30%.

The addition of calcium titanate or magnesium titanate is effective for improving the temperature characteristics, and also for decreasing the sintering temperature. When more than 10 wt% of calcium titanate or magnesium titanate is incorporated, the dielectric constant is disadvantageously decreased. When less than 0.01 wt% of calcium titanate or magnesium titanate is incorporated, the beneficial effects are unsubstantial. The sintering properties of the ceramic can be improved by adding 0.01 – 0.5 wt% or at least one of the oxides of Mn, Cr, Fe, Ni or Co, clay or a rare earth element, preferably as an oxide as a mineralizer.

In accordance with the compositions of this invention, ceramic dielectric compositions having high dielectric constants, excellent characteristics in high frequency operation, small temperature dependencies for their dielectric constants over a broad range, and low losses can be obtained. The compositions have substantially no pin-holes and are not bent by the sintering step. They can form thin plates having high density. The heavy metal pollution problem is not encountered and the compositions of the invention are industrially advantageous.

Having generally described the invention, a more complete understanding can be obtained by reference to certain specific examples, which are included for purposes of illustration only and are not intended to be limiting unless otherwise specified.

EXAMPLE

Samples are prepared as follows. Barium carbonate ($BaCO_3$) and titanium oxide ($TiO_2$) in a ratio of 1 : 1; calcium carbonate ($CaCO_3$) and titanium oxide (($TiO_2$) in a ratio of 1 : 1 and magnesium carbonate ($MgCO_3$) and titanium oxide ($TiO_2$) in a ratio of 1 : 1 were respectively mixed for 20 hours by a ball-mill in a wet process. The mixture was dried and calcined at 1100 - 1200° C for 2 hrs. to form $BaTiO_3$, $CaTiO_3$ and $MgTiO_3$. The products were respectively crushed to form fine powders having an average diameter of about 2.5 $\mu$ m. These starting materials were measured out in the proportions as set forth in Table 1, and were mixed in a wet process in a ball-mill. Water was removed from the mixture and a binder of polyvinyl alcohol was added to each in a ratio of 10–15 wt parts to 100 wt parts of the fine powder. The mixtures were compressed in a mold having a diameter of 16 mm and a thickness of 0.6 mm under a pressure of 3 ton/cm². The shaped mixtures were sintered at 1200 – 1380° C for 2 hours. Silver electrodes were formed on each surface of the sintered substrates and the electrical characteristics of the sintered substrates were measured. The particle sizes of the raw materials were as follows.

| | |
|---|---|
| $BaCO_3$ | particle size 1.5 – 2.5 $\mu$m |
| $TiO_2$ | particle size 0.3 – 0.7 $\mu$m |
| $CaCO_3$ | particle size 2 – 2.5 $\mu$m |
| $MgCO_3$ | particle size 1 4 $\mu$m |

The results are shown in Table 1.

The measurements of the capacity and the dielectric tangent were conducted at 25° C (room temperature) by using a Multi-purpose bridge model 4255A (manufactured by YEW), applying 5 volts of AC voltage for the measurement.

In Table 1, samples Nos. 8,9,10,11,13,20,28,29 and 30 are out of the scope of claims and are provided for reference only. The composition, H, is also for reference only. It incorporates 98.5 mole% of bismuth stannate. In the following tables, the meanings of the symbols are as follows.

| | |
|---|---|
| $T_2$: | sintering temperature |
| es: | dielectric constant |
| tan δ: | dielectric tangent |
| T.C.: | temperature characteristics (standard of 20° C) |

Table 1

| Sample No. | (mole %) $BaTiO_3$ | (mole %) $CeO_2$ | (mole %) $Nb_2O_5$ | (wt. %) $CaTiO_3$ | (wt. %) $MgTiO_3$ | $T_2$ (° C) | es 1 KHz | tan δ 1 KHz | T. C. (%) −25° C | T. C. (%) +85° C |
|---|---|---|---|---|---|---|---|---|---|---|
| 1 | 98 | 1 | 1 | 0 | 0 | 1320 | 5200 | 2.0 | −29 | −31 |
| 2 | 98.2 | 1 | 0.8 | 0 | 0 | 1320 | 5030 | 2.1 | −35 | −24 |
| 3 | 97.8 | 1 | 1.2 | 0 | 0 | 1320 | 5760 | 1.8 | −31 | −42 |
| 4 | 97.8 | 1.2 | 1.0 | 0 | 0 | 1320 | 6060 | 1.9 | −35 | −39 |
| 5 | 98 | 1.2 | 0.8 | 0 | 0 | 1320 | 5800 | 1.8 | −37 | −31 |
| 6 | 98 | 0.8 | 1.2 | 0 | 0 | 1320 | 5440 | 1.9 | −31 | −38 |
| 7 | 97 | 1 | 2 | 0 | 0 | 1300 | 3000 | 0.8 | +11 | −27 |
| 8 | 98 | 2 | 0 | 0 | 0 | hard to be sintered (<1400° C) | | | | |
| 9 | 98 | 0 | 2 | 0 | 0 | 1300 | 2500 | 2.2 | −15 | −17 |
| 10 | 98.9 | 0.1 | 1 | 0 | 0 | 1300 | 2300 | 2.1 | −15 | −22 |
| 11 | 94 | 5 | 1 | 0 | 0 | 1300 | 1200 | 0.8 | +20 | −31 |
| 12 | 99.6 | 0.2 | 0.2 | 0 | 0 | 1370 | 2200 | 2.3 | −23 | +32 |
| 13 | 88 | 1 | 11 | 0 | 0 | 1200 | 880 | 1.7 | +42 | −60 |
| 14 | 98 | 0.8 | 1.2 | 1 | 0 | 1320 | 4311 | 1.6 | −26 | −28 |
| 15 | 98 | 0.8 | 1.2 | 2 | 0 | 1320 | 4020 | 1.7 | −28 | −23 |
| 16 | 98 | 0.8 | 1.2 | 3 | 0 | 1320 | 3585 | 1.8 | −26 | −11 |
| 17 | 98 | 0.8 | 1.2 | 4 | 0 | 1300 | 3369 | 1.9 | −25 | − 4 |

Table 1-continued

| Sample No. | (mole %) BaTiO₃ | (mole %) CeO₂ | (mole %) Nb₂O₅ | (wt. %) CaTiO₃ | (wt. %) MgTiO₃ | T₂ (°C) | $\epsilon_s$ 1 KHz | tan δ 1 KHz | T.C. (%) -25°C | T.C. (%) +85°C |
|---|---|---|---|---|---|---|---|---|---|---|
| 18 | 98 | 0.8 | 1.2 | 5 | 0 | 1300 | 3200 | 1.9 | -24 | +3 |
| 19 | 98 | 0.8 | 1.2 | 7 | 0 | 1280 | 3010 | 2.1 | -23 | +17 |
| 20 | 98 | 0.8 | 1.2 | 11 | 0 | 1280 | 2430 | 2.6 | -20 | +28 |
| 21 | 97.8 | 0.9 | 1.3 | 4 | 0 | 1300 | 3614 | 1.8 | -23 | -15 |
| 22 | 96.8 | 0.2 | 3.0 | 0 | 0 | 1270 | 1930 | 1.0 | +25 | -34.5 |
| 23 | 97.6 | 1.4 | 1.0 | 0 | 0 | 1320 | 4600 | 1.3 | -15 | -45 |
| 24 | 88.5 | 2.5 | 9.0 | 0 | 0 | 1220 | 930 | 0.5 | +30 | -45 |
| 25 | 92.0 | 2.0 | 6.0 | 0 | 0 | 1250 | 1200 | 1.5 | -10 | -22 |
| 26 | 98 | 0.8 | 1.2 | 0 | 1 | 1300 | 4305 | 1.5 | -24.7 | -28 |
| 27 | 98 | 0.8 | 1.2 | 0 | 5 | 1300 | 3000 | 1.5 | -23.8 | -26 |
| 28 | 98 | 0.8 | 1.2 | 0 | 12 | 1280 | 2300 | 1.1 | -19.6 | -24 |
| 29 | 85.5 | 4.5 | 10 | 0 | 0 | 1220 | 800 | 0.5 | +27 | -30 |
| 30 | 99.7 | 0.2 | 0.1 | 0 | 0 | hard to be sintered (<1400° C) | | | | |
| 31 | 98 | 0.8 | 1.2 | 0.5 | 0 | 1320 | 4800 | 1.8 | -30 | -34 |
| 32 | 98 | 0.8 | 1.2 | 10 | 0 | 1280 | 2600 | 2.4 | -20 | +25 |
| 33 | 98 | 0.8 | 1.2 | 0 | 0.5 | 1320 | 4750 | 1.6 | -28 | -32 |
| 34 | 98 | 0.8 | 1.2 | 0 | 7.5 | 1280 | 2700 | 1.4 | -24 | -25 |
| 35 | 98 | 0.8 | 1.2 | 0 | 10 | 1280 | 2530 | 1.2 | -26.3 | -24 |
| 36 | 98 | 0.8 | 1.2 | 2 | 7 | 1280 | 2300 | 1.6 | -25 | -23 |
| 37 | 98 | 0.8 | 1.2 | 4 | 4 | 1280 | 2600 | 1.6 | -27 | -10 |
| 38 | 98 | 0.8 | 1.2 | 7 | 2 | 1280 | 2550 | 1.7 | -28 | -5 |
| H | 98.5 mole % Bi₂(SnO₃)₃ | | | 1.5 mole % | | 1270 | 2400 | 2.3 | +7.8 | -9.5 |

The effects of the additives on the composition of Sample No. 1 of Table 1, are shown in Table 2.

Table 2

| Additive | Amount (wt.%) | T₂ (°C) | $\epsilon_s$ 1 KHz | tan δ (%) 1 KHz | T.C. -25°C | T.C. +85°C |
|---|---|---|---|---|---|---|
| none | 0 | 1320 | 5200 | 2.0 | -29 | -31 |
| MnO | 0.1 | | 3900 | 1.0 | -16 | -28 |
| | 0.3 | 1320 | 2950 | 0.7 | -2 | -32 |
| CoO | 0.1 | 1320 | 4300 | 1.9 | -17 | -30 |
| | 0.3 | 1300 | 2600 | 1.6 | -5 | -7 |
| clay | 0.1 | 1320 | 5050 | 2.0 | -30 | -31 |
| | 0.3 | 1320 | 4450 | 1.9 | -28 | -33 |
| La₂O₃ | 0.05 | 1320 | 5000 | 1.8 | -28 | -32 |
| | 0.4 | 1320 | 3800 | 1.6 | -15 | -37 |

The effects of the additives on the composition of Sample No. 7 of Table 1, are shown in Table 3.

Table 3

| Additive | Amount (wt %) | T₂ (°C) | $\epsilon_s$ 1 KHz | tan δ (%) 1 KHz | T.C. -25°C | T.C. +85°C |
|---|---|---|---|---|---|---|
| none | 0 | 1300 | 3000 | 0.8 | +11 | -27 |
| MnO | 0.1 | 1320 | 2420 | 0.6 | +15 | -32 |
| | 0.3 | 1320 | 1800 | 0.5 | -17 | -36 |
| CoO | 0.1 | 1320 | 2750 | 0.8 | +8 | -20 |
| | 0.3 | 1280 | 2100 | 0.6 | +1 | -6 |
| clay | 0.1 | 1320 | 2900 | 0.8 | +12 | -26 |
| | 0.3 | 320 | 2400 | 0.7 | +10 | -25 |
| La₂O₃ | 0.05 | 1320 | 2950 | 0.8 | +12 | -28 |
| | 0.4 | 1320 | 2100 | 0.6 | +22 | -34 |

The effects of the additives on the composition of Sample No. 15 of Table 1 are shown in Table 4.

Table 4

| Additive | Amount (wt.%) | T₂ (°C) | $\epsilon_s$ 1 KHz | tan δ (%) 1 KHz | T.C. -25°C | T.C. +85°C |
|---|---|---|---|---|---|---|
| none | 0 | 1320 | 4020 | 1.7 | -28 | -23 |
| MnO | 0.1 | 1320 | 3850 | 1.5 | -26 | -25 |
| | 0.4 | 1320 | 2740 | 1.2 | -20 | -26 |
| CoO | 0.1 | 1320 | 3450 | 1.6 | -25 | -18 |
| | 0.4 | 1200 | 2050 | 1.5 | -1 | -3 |
| clay | 0.1 | 1320 | 3900 | 1.7 | -28 | -24 |
| | 0.2 | 1320 | 3600 | 1.6 | -27 | -26 |
| La₂O₃ | 0.05 | 1320 | 3900 | 1.5 | -28 | -25 |
| | 0.2 | 1320 | 3650 | 1.5 | -20 | -27 |

The effects of the additives on the composition of Sample No. 18 of Table 1, are shown in Table 5.

Table 5

| Additive | Amount (wt%) | T₂ (°C) | $\epsilon_s$ 1 KHz | tan δ (%) 1 KHz | T.C. -25°C | T.C. +85°C |
|---|---|---|---|---|---|---|
| none | 0 | 1300 | 3200 | 1.9 | -24 | +3 |
| MnO | 0.05 | 1300 | 3050 | 1.7 | -23 | +2 |
| | 0.2 | 1300 | 2700 | 1.4 | -20 | -2 |
| CoO | 0.1 | 1300 | 3050 | 1.8 | -20 | 0 |
| | 0.3 | 1280 | 2400 | 1.7 | -9 | +5 |
| clay | 0.1 | 1300 | 3100 | 1.8 | -24 | +2 |
| | 0.3 | 1300 | 2800 | 1.8 | -23 | -1 |
| La₂O₃ | 0.05 | 1300 | 3050 | 1.8 | -21 | -2 |
| | 0.2 | 1300 | 2600 | 1.7 | -8 | -15 |

In accordance with the addition of the special additives discussed above, the inferiorities of the ceramic dielectric compositions in the sintering step can be avoided, enabling the formation of a dense ceramic. Additionally, bending and curving of the ceramic during sintering can be prevented. The amount of the additive employed is in the range necessary for maintaining the desired electrical characteristics of the ceramic.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A dielectric ceramic composition which comprises as principle constituents, 86–99.6 mole % of barium titanate, 0.2 – 10 mole% of niobium pentaoxide and 0.2 – 4 mole% of cerium oxide.

2. The dielectric ceramic composition of claim 1, which comprises as principle constituents, 92 – 99.6 mole% of barium titanate, 0.2 – 6.0 mole% of niobium pentaoxide and 0.2 – 2.0 mole% of cerium oxide.

3. The dielectric ceramic composition of claim 1, which further contains at least one of calcium titanate or magnesium titanate in an amount of less than 10 wt% relative to the total amount of the principle constituents.

4. The dielectric ceramic composition of claim 3, wherein at least one of calcium titanate or magnesium titanate is present in an amount of 0.5 – 5.0 wt% relative to the total amount of the principle constituents.

5. The dielectric ceramic composition of claim 1, which further comprises at least one of the oxides of Mn, Cr, Fe, Ni or Co, clay or a rare earth element in an amount of 0.01 – 0.5 wt% relative to the total amount of the principle constituents.

6. The dielectric ceramic composition of claim 5, wherein at least one of the oxides of Mn, Cr, Fe, Ni and Co, clay or a rare earth element is present in an amount of 0.05 – 0.3 wt% relative to the total amount of the principle constitutents.

7. The dielectric ceramic composition of claim 1, which further comprises at least one of calcium titanate or magnesium titanate in an amount of less than 10 wt% relative to the total amount of the principle constituents and at least one of the oxides of Mn, Cr, Fe, Ni and Co, clay or rare earth element in an amount of 0.01 – 0.5 wt% relative to the total amount of the principle constituents.

8. The dielectric ceramic composition of claim 5, wherein the rare earth element is present in the form of an oxide.

9. The dielectric ceramic composition of claim 1, comprising 98 mole% barium titanate, 1 mole% niobium pentaoxide and 1 mole% cerium oxide.

10. The dielectric ceramic composition of claim 7, comprising 0.05 wt% of MnO and 5 wt% of calcium titanate relative to the total amount of principle constituents in the composition of 98 mole% barium titanate, 0.8 mole% cerium oxide, and 1.2 mole% niobium pentaoxide.

* * * * *

UNITED STATES PATENT AND TRADEMARK OFFICE
CERTIFICATE OF CORRECTION

Figure 2:
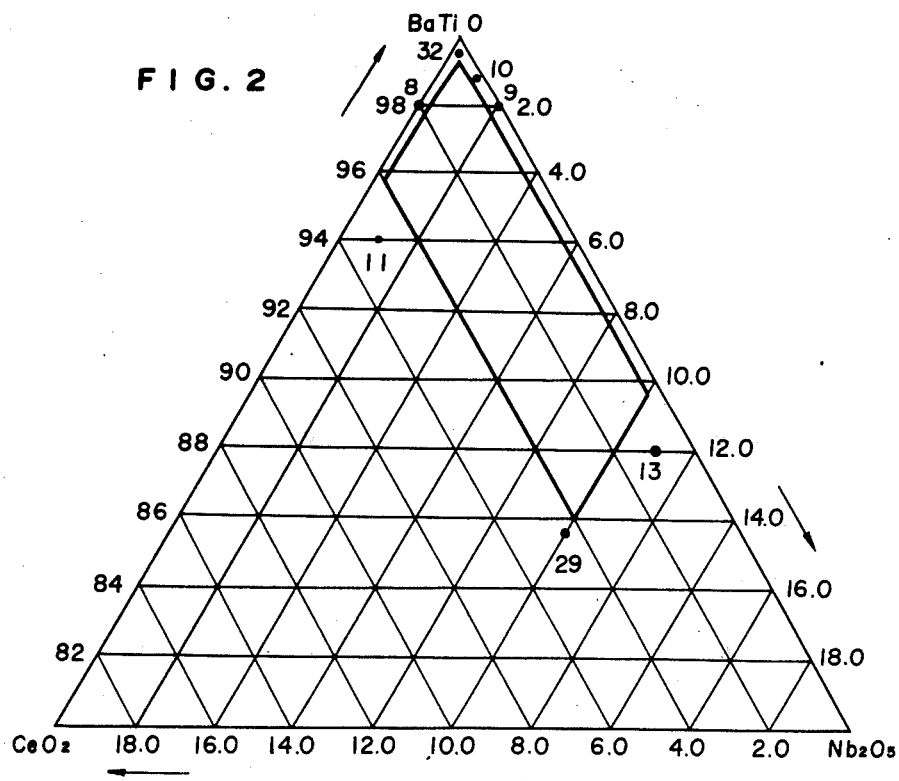
FIG. 2 shows a ternary diagram of the three main components of barium titanate, cerium oxide and niobium pentaoxide depicting the compositions within the scope of this invention.

PATENT NO. : 4,014,707
DATED : March 29, 1977
INVENTOR(S) : HITOSHI TANAKA ET AL It is certified that error appears in the above-identified patent and that said Letters Patent are hereby corrected as shown below:

Figure 2, at the top, "BaTiO" should be --$BaTiO_3$--.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*